W. T. HENSLEY.
APPARATUS FOR CHARGING STORAGE BATTERIES.
APPLICATION FILED NOV. 9, 1914.

1,256,228. Patented Feb. 12, 1918.

Witnesses:
Arthur W. Carlson
Rachel J. Richardson.

Inventor:
William T. Hensley
by Arthur F. Durand
Atty.

UNITED STATES PATENT OFFICE.

WILLIAM T. HENSLEY, OF BOUNDBROOK, NEW JERSEY, ASSIGNOR, BY MESNE ASSIGNMENTS, TO BOUND BROOK ENGINE & MFG. CO., A CORPORATION OF DELAWARE.

APPARATUS FOR CHARGING STORAGE BATTERIES.

1,256,228.  Specification of Letters Patent.  Patented Feb. 12, 1918.

Application filed November 9, 1914. Serial No. 871,004.

*To all whom it may concern:*

Be it known that I, WILLIAM T. HENSLEY, a citizen of the United States of America, and resident of Boundbrook, Somerset county, New Jersey, (229 Mountain avenue,) have invented a certain new and useful Improvement in Apparatus for Charging Storage Batteries, of which the following is a specification.

My invention relates to apparatus for charging storage batteries in general, but more particularly to apparatus of this kind in which the generator is dependent for its operation upon a variable speed source of power, and especially those in which the said source of power is the internal combustion engine of an automobile or other vehicle. In charging a storage battery by a generator driven from the engine of an automobile, it is desirable to have the generator operate at a constant speed, or substantially so, under all conditions, so that the charging current will be uniform at all times, without the use of auxiliary electrical current regulating apparatus or devices. Some provision, therefore, must be made for insuring a constant speed of the generator, notwithstanding that the speed of the engine varies considerably. A centrifugal friction clutch may be used for this purpose, but ordinarily a clutch of this kind is subject to some change or variation (when the friction elements become heated or worn) when in operation. In other words, the friction of the parts, with the material or substances ordinarily employed in clutches of this character, tends to increase the wear, and hence a frequent adjustment of the clutch would, under such conditions, be necessary in order to insure the desired uniformity of the charging current. In other words, the generator should run at a given speed at all times; but with the materials ordinarily used in clutches of this kind, the friction and resulting wear of the parts is considerable, and frequent adjustment becomes necessary. Such being the case, it follows that with ordinary friction clutches, operating under a constant spring tension, the charging current would have a tendency to change as the clutch becomes worn, which is very undesirable. In charging storage batteries, it is not only regarded as improper to allow the current to rise, or "climb" as it is called, from the beginning of the charge, but it is also regarded as being beneficial if the current is allowed to fall off or drop appreciably after the starting thereof, and during the charging period. In other words, the current should not be allowed to rise, but should fall away from the maximum current at which the charging operation commences, as the charging operation progresses.

It is well known to those skilled in the art that if the speed of the generator and the strength of the charging current are kept at a predetermined maximum during the entire period of the charging operation, gassing or boiling of the battery is likely to result, and a substantial amount of generated current is wasted. If, however, the generator speed is progressively reduced and the length of the charging period increased there will result, a substantial saving of the generated current, and the gassing or boiling of the battery will be practically eliminated.

My invention is especially valuable when used in connection with storage batteries which, after being used for a short interval of time, are immediately brought up to their normally full strength, having the current restored by recharging. For instance, when an automobile engine is started, the current from the battery is utilized at a heavy amperage for a fraction of a minute. When the engine has been started and is running, and the battery is being recharged, the amperage of the charging current will be light as compared to that of the starting current; and it will take a number of minutes to recharge the battery in order to replenish the amount of current used in starting. At about the time the full amount of current has been restored to the battery, the clutch will have heated up, thus causing slippage of the clutch parts, and the consequent falling off of the charging current as herein referred to.

An object of my invention is, therefore, to provide a centrifugal friction clutch for use in combination with a source of power of variable speed for driving the constant speed generator by which the current is supplied to the storage battery for charging purposes, the said clutch being of such character that the heat or wear of the friction surfaces therein will not cause the generator to run faster, and the wearing elements of the said clutch being of such character that the said generator will, in fact, run a little slower, if anything, when the clutch becomes highly heated in operation, whereby the charging current will have no inclination to rise or "climb" during the charging operation.

Another object is to provide a substance or material for the brake bands of the clutch, of such character that it will impart a high polish to the revolving brake drum, and serve not only to minimize the wear of the friction elements, but also to prevent the generator from speeding up when said bands and drum become heated.

To these and other useful ends, my invention consists in matters hereinafter set forth and claimed.

In the accompanying drawings—

Figure 1:
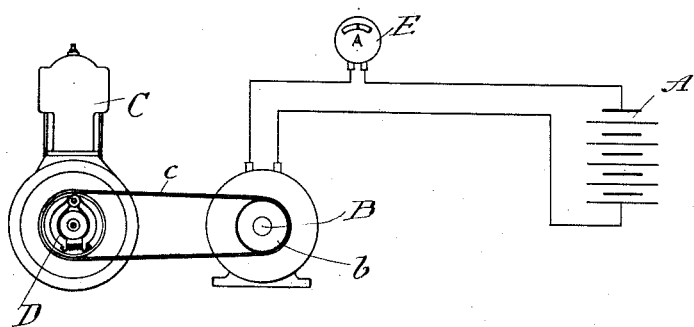
Figure 1 is a diagram showing a storage battery charging apparatus embodying the principles of my invention.
Figure 2:
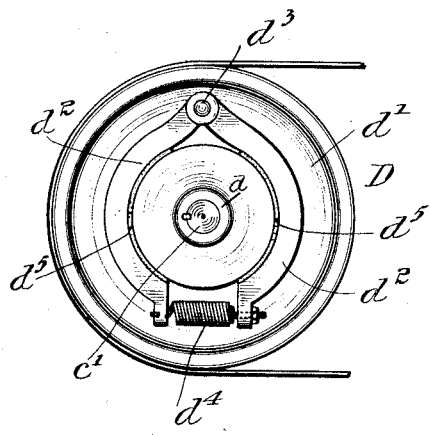
Fig. 2 is an enlarged detail view of the centrifugal friction clutch employed in said apparatus for converting the variable speed of the automobile engine into a constant speed on the part of the generator which supplies the current to the storage battery during the charging operation.

As thus illustrated, the storage battery A may be of any suitable known or approved character. A constant speed generator B, of any suitable or desired construction, is connected with the storage battery in the usual and well known manner. An internal combustion engine C, of any suitable form or construction, is connected by a belt $c$ with said generator. As thus illustrated, the said battery and generator and engine may be those ordinarily found on automobiles having an electric apparatus for charging the battery which supplies current for starting and lighting and other purposes. In such case, the said engine is, of course, in the nature of a variable speed source of power, inasmuch as it runs slowly at times and very fast at other times; and for this reason some provision must be made for maintaining the speed of the generator constant under all conditions and for all speeds of said engine. For this purpose, a centrifugal friction clutch D is mounted on the engine shaft and connected by the said belt with a pulley $b$ on the armature shaft of the generator. The said clutch has a ring $d$ which is fixed on the engine shaft $c^1$, and is provided with a loose member $d^1$ which is engaged by the said belt. In order to connect the outer or loose member $d^1$ with the engine shaft, brake shoes or bands $d^2$ are provided and pivoted to said member $d^1$ at $d^3$, the other ends of said shoes being connected together by a spring device $d^4$ of any suitable character. The said device $d^4$ is adjustable in any suitable manner for the purpose of varying the spring tension thereof, and for thereby increasing or decreasing the pressure of the brake shoes on the ring or drum $d$, depending upon the speed desired for the generator. Centrifugal force will cause the brake shoes or bands $d^2$ to bear with less pressure on the drum when the engine is running at high speed, than when running at low speed, with the result that the speed of the generator is maintained constant, notwithstanding the fluctuations of the engine speed. The said ring $d$ is made of metal, as, for example, cast iron or steel, and is provided with a perfectly smooth periphery upon which the brake shoes bear. Each brake shoe is preferably provided with a face or engaging portion $d^5$ of a substance which produces a high polish on the periphery of the ring $d$, and of such nature that it does not increase the friction when the clutch is operating or becomes highly heated. For this purpose, the wearing portions $d^5$ of said brake shoes may be made of carbon, such as ordinary carbon, with the addition of some graphite carbon, such as that used for electric motor brushes; but the invention is not limited to this particular substance, as other substances which will minimize the wear and burnish the periphery of the ring $d$, and which will prevent an increase of friction when heated and during operation thereof, thus insuring against a variation of the speed of the generator, may be used for this purpose. As stated, carbon fulfils the requirements in this respect, and in actual practice the friction of the clutch not only does not increase when the parts become heated, but to the contrary appears to become somewhat less; and the result is that the heating of the clutch not only does not cause the current to rise or "climb" during the charging operation, but if anything seems to produce a slight falling off or dropping of the current. Moreover, the burnishing or polishing action is such that wear is greatly reduced, thus making frequent adjustments unnecessary. The current measuring instrument E, connected as usual in circuit with the generator and battery, does not indicate any increase of current when the clutch becomes hot, or after the engine has been running for some time. This is for the reason that the carbon-to-metal wearing elements do not suffer an increase of friction when they are heated, but to the contrary seem to produce less friction at such time than when the clutch is first operated. Thus a substance is interposed in the clutch to prevent the heat from increasing the friction and to reduce wear, thereby enabling the generator to run at constant speed, or even with a slight falling off in speed, when driven from a source of power of variable speed.

As stated, there are two reasons why the ordinary friction clutch is not satisfactory for connecting a variable speed source of power to an electric generator. First, the substances or materials ordinarily used for a clutch of this kind are subject to excessive wear to an extent requiring frequent adjustment to compensate therefor; and, second, these substances are affected by heat in a manner that makes the brake shoes slide less readily on the surface of the drum, thereby increasing the speed of the generator. With my invention, however, both of these difficulties are overcome, as the carbon of the brake shoes burnishes the metal surface of the drum or ring, and the action of the graphite is such that very little wear occurs; and, what is equally important, the heating of the parts does not reduce the freedom or ease with which the carbon shoes slide over the polished metal surface of the drum. In fact, this sliding action is perfectly free and easy under all conditions, and even better after the clutch has been in operation for some time and has become heated.

What I claim as my invention is:—

1. Apparatus for charging a storage battery, comprising a battery, a variable speed source of power, a generator connected with said battery, and means including a centrifugal friction clutch for driving said generator at proper speed from said source of power, said clutch having carbon-to-metal wearing elements to prevent the heat of friction from increasing the speed of said generator.

2. Apparatus for charging a storage battery, comprising a battery, a variable speed source of power, a generator connected with said battery, and means including a centrifugal friction clutch for driving said generator at proper speed from said source of power, said clutch having wearing elements composed of substances to prevent the heat of friction from increasing the speed of said generator.

3. Apparatus for charging a storage battery, comprising a battery, a variable speed source of power, a generator connected with said battery, and means including a centrifugal friction clutch for driving said generator at proper speed from said source of power, said clutch having wearing elements composed of substances including graphite to prevent the heat of friction from increasing the speed of said generator.

Signed by me at Boundbrook, Somerset Co., N. J., this 2nd day of November, 1914.

WILLIAM T. HENSLEY.

Witnesses:
 FLORENCE A. HOSKING,
 E. R. FULLER.